Figures 1, 2:
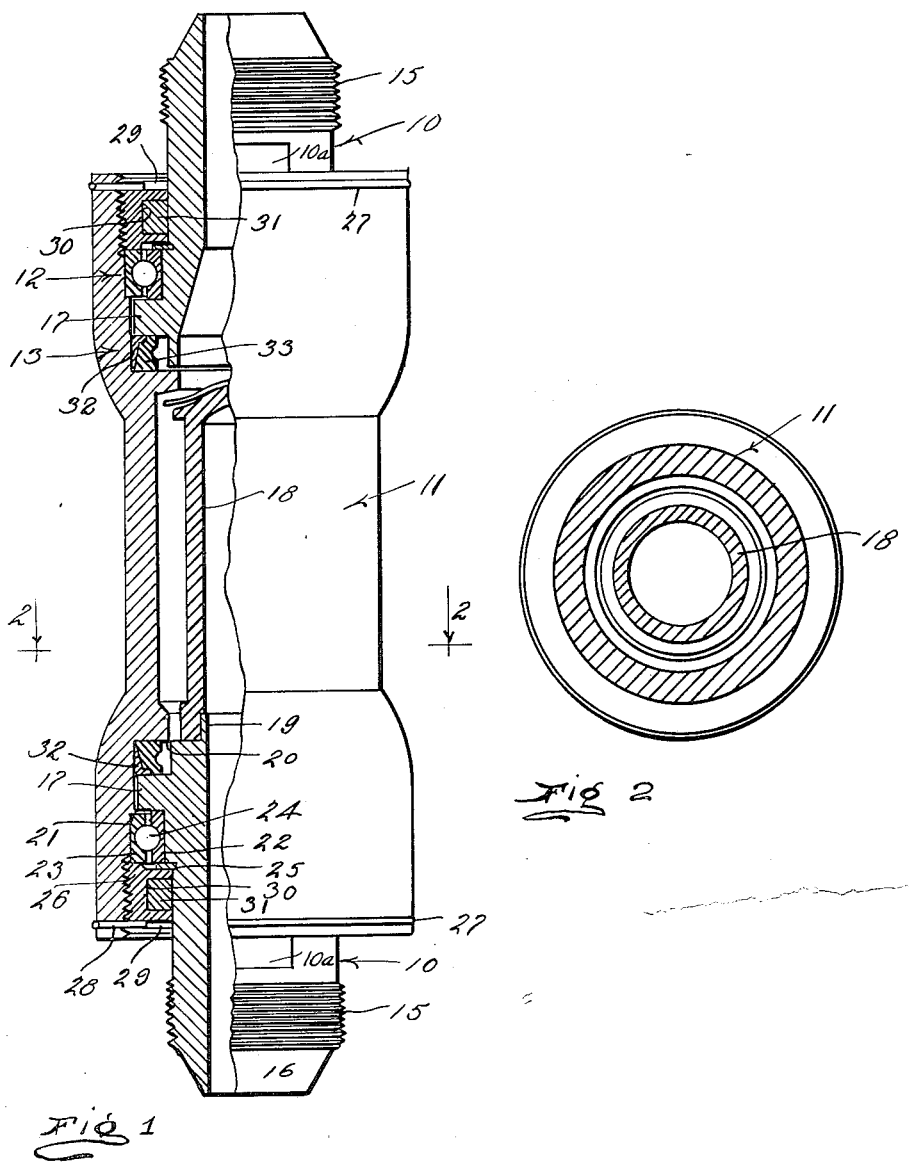

June 26, 1945.   D. M. PHILLIPS   2,379,035
SWING JOINT
Filed June 30, 1943

Inventor
Dwight M. Phillips
By
His Attorney

Patented June 26, 1945

2,379,035

UNITED STATES PATENT OFFICE 2,379,035

SWING JOINT

Dwight M. Phillips, Fullerton, Calif., assignor to Chiksan Tool Company, Brea, Calif., a corporation of California Application June 30, 1943, Serial No. 492,828

11 Claims. (Cl. 210—164)

This invention relates to joints or connections and relates more particularly to swivel joints or swing joints for use in fluid handling lines, systems, etc. A general object of this invention is to provide a dependable, compact, and effective swing joint.

Another object of this invention is to provide a swing joint to be interposed in a fluid conduit or fluid handling system and which is adapted to carry a filter or the like for filtering or otherwise acting on the fluid handled.

Another object of this invention is to provide a swing joint that embodies a simple, one-piece intermediate section in which the filter is housed and end sections rotatably connected with the intermediate section and adapted to be connected with the conduit parts or fluid handling parts of the system.

Another object of this invention is to provide a swing joint embodying dependable and very effective anti-friction bearing means connecting the sections for free relative rotation.

A further object of this invention is to provide a swing joint of the character referred to in which the bearing means may be easily made accessible for inspection, repair, etc., without disturbing the other elements of the joint or the line.

The various objects and features of my invention will be fully understood from the following detailed description of a typical preferred form and application of the invention, throughout which description reference is made to the accompanying drawing, in which:

Fig. 1 is a side elevation of the swing joint provided by this invention with a portion broken away to illustrate the principal parts in longitudinal cross section. Fig. 2 is a transverse, detailed, sectional view taken as indicated by line 2—2 on Fig. 1.

The improved swing joint of the present invention may be said to comprise, generally, two end sections 10, an intermediate section 11, anti-friction bearing means 12 connecting the sections 10 and 11 for free relative rotation, and means 13 for sealing between the sections.

The end sections 10 are in the nature of nipples adapted to be connected with the spaced adjacent parts of a tubing line, pipe line, or fluid conducting system. The sections 10 may be alike or similar and are simple one-piece parts. The end sections 10 are tubular having central longitudinal openings 14 and their outer ends are prepared for connection with pipe line or tubing parts. In the particular case illustrated the outer end portions of the sections 10 carry external screw threads 15 to facilitate their connection with the pipe line elements and have tapered end faces 16. The sections 10 are flattened at 10ᵃ to receive a wrench or the like. Annular external flanges 17 are provided on the sections 10 adjacent their inner ends. One section 10 is formed to carry a filter unit 18, or the like. The inner end of one section 10 has an inwardly extending annular rim 19 and the filter unit 18 is engaged over this rim to be supported by the section 10.

The intermediate section 11 is the body part of the swing joint and is an elongate tubular member. The opposite end portions of the section 11 are belled, or enlarged in both internal and external diameter, to receive the sections 10 with substantial clearance and to contain the bearing means 12 and the sealing means 13. Annular internal shoulders 20 and 21 are provided in each end portion of the section 11. The shoulders 20 and 21 face outwardly or toward the ends of the section 11 and the shoulders 20 are of substantial width. The shoulders 20 are spaced inwardly from the shoulders 21 which in turn are spaced inwardly from the extremities of the section 11. The section 11 is proportioned so that it receives the filter unit 18 with substantial clearance, there being an annulus of considerable width surrounding the filter unit. As illustrated the filter unit 18 may be contained entirely within the intermediate section 11.

The means 12 for connecting the end sections 10 with the intermediate section 11 are in the nature of anti-friction bearing means. Each means 12 includes an anti-friction bearing arranged within an end portion of the section 11 and surrounding a section 10. Each bearing includes inner and outer races 22 and 23 and series of balls 24 engaged between the races. The inner ends of the inner races 22 engage against the flanges 17 while the inner ends of the outer races 23 engage against the shoulders 21. Safety lock wires or lock rings 25 are engaged or sprung into annular grooves in the exterior of the sections 10 and are engaged by the outer ends of the section 11 and their inner ends cooperate with the outer ends of the outer races 23. The inner ends of the nuts 26 are relieved to receive and cooperate with the lock rings 25.

Means are provided for locking the nuts 26 against unthreading. These means include wires 27 engaged in grooves at the exterior of the section 11 adjacent its ends. The wires 27 have end parts 28 extending inwardly through radial openings in the wall of the section 11 and cooperating with slots or grooves 29 in the outer ends of the nuts 26. The wires 27 dependably lock the nuts 26 against loosening and unthreading. It will be seen that the anti-friction bearings arranged as described above dependably connect the sections 10 and 11 for free relative rotation. The anti-friction bearings are operable to transmit radial thrusts and axial thrusts in both directions. Grease or lubricant retaining means are associated with the lock nuts 26. An internal groove 30 is provided in each nut 26 and grease retainer rings 31 of felt or the like are set in the grooves to cooperate with the external surfaces of the end sections 10. The felt rings 31 prevent the lubricant for the anti-friction bearings from leaking between the sections 10 and 11 and prevent foreign matter particles from reaching the bearings.

The sealing means 13 are provided to prevent the leakage of fluid from between the sections 10 and 11. The sealing means 13 are located in the spaces or grooves which occur between the flanges 17 and the shoulders 20. Each sealing means includes a backing ring 32 of brass, or the like. The backing rings 32 bear against the internal surfaces of the section 11 and are thickened or flanged at their outer ends where they bear against the flanges 17. Sealing rings 33 of suitable sealing material such as rubber, or synthetic rubber, engage within the backing rings 32. The backing rings 32 and the sealing rings 33 have cooperating pitched or sloping surfaces, as clearly shown in Fig. 1. The outer ends of the sealing rings 33 engage and seal with the inner sides of the flanges 17 while the inner ends of the sealing rings 33 engage and seal with the shoulders 20. The engagement of the sealing rings 33 with the shoulders 20 is more extensive than the engagement of the sealing rings with the flanges 17. As a result of this relationship the sealing rings 33 tend to remain stationary with or to rotate with the intermediate section 11, as the case may be, and have only limited surfaces subjected to wear as a result of the relative rotation between the sections. The interiors of the rings 33 may be relieved or grooved so that fluid pressure within the rings tends to expand them axially into effective sealing engagement with the shoulders 20 and flanges 17. It will be observed that the interiors of the sealing rings 33 are exposed to the fluid pressure handled by the line.

It is believed that the utility and practicability of the swing joint provided by this invention will be readily understood from the foregoing detailed description. The filter unit 18 is carried by one of the sections 10 to be housed entirely within the intermediate section 11 where it acts on the fluid passed through the joint. The anti-friction bearings of the means 12 mounted as described above are dependable in transmitting radial thrusts and axial thrusts in both directions and thus positively connect the sections 10 and 11 for free relative rotation. The sealing rings 33 engaged between the flanges 17 and the shoulders 20 and actuated by the line pressures, dependably prevent the escape or leakage of fluid from between the sections. It will be observed that the anti-friction bearings are readily made accessible by removing the wires 27 and the lock nuts 26. Upon removal of the lock nuts 26 the safety rings 25 are exposed and readily removed to free the bearings.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A joint adapted to be interposed in a fluid conducting line including tubular end sections adapted to be connected to parts of the line, a tubular intermediate section, ball bearings connecting each of the end sections with the intermediate section for free relative rotation and to communicate therewith, and a filter unit within the intermediate section.

2. A joint adapted to be interposed in a fluid conducting line including tubular end sections adapted to be connected to parts of the line, a tubular intermediate section, anti-friction bearing means connecting the sections for free relative rotation and to communicate with each other, and a filter unit carried by one of the end sections and disposed within the intermediate section.

3. A joint adapted to be interposed in a fluid conducting line including an intermediate tubular section, end tubular sections entering the opposite ends of the intermediate section and communicating therewith, the end sections being formed for connection with parts of the line, anti-friction bearings within the opposite ends of the intermediate section for connecting the sections for free relative rotation, and a filter unit secured to the inner end of an end section to be within the intermediate section.

4. A joint adapted to be interposed in a fluid conducting line including an intermediate tubular section, the opposite end portions of the intermediate sections being enlarged in internal diameter, tubular end sections adapted to be secured to parts of said line and entering the enlarged end portions of the intermediate section to be in communication with the intermediate section, anti-friction bearing means in said enlarged end portions of the intermediate section for connecting the intermediate and end sections for free relative rotation, means in said end portions of the intermediate section for preventing the leakage of fluid from between the sections, and a filter unit secured to the inner end of an end section to be within the intermediate section.

5. A joint adapted to be interposed in a fluid conducting line including an intermediate tubular section, the opposite end portions of the intermediate section being enlarged in internal diameter and having internal shoulders, tubular end sections adapted to be secured to parts of said line and entering the enlarged end portions of the intermediate section to be in communication with the intermediate section, the portions of the end sections which enter the intermediate section having external annular flanges, anti-friction bearings engaged against said shoulders and the outer sides of said flanges and fitting within the end portions of the intermediate section to connect the end sections and the intermediate section for free relative rotation, and means for holding the bearings against said flanges and shoulders.

6. A joint adapted to be interposed in a fluid conducting line including an intermediate tubular section, the opposite end portions of the intermediate section being enlarged in internal diameter and having internal shoulders, tubular end sections adapted to be secured to parts of said line and entering the enlarged end portions of the intermediate section to communicate therewith, the portions of the end sections which enter the intermediate section having external annular flanges, anti-friction bearings engaged against said shoulders and the outer sides of said flanges and fitting within the end portions of the intermediate section to connect the end sections and the intermediate section for free relative rotation, means for holding the bearings against said flanges and shoulders, and sealing means engaged against the inner sides of the flanges for sealing between the sections.

7. A joint adapted to be interposed in a fluid conducting line including an intermediate tubular section, the opposite end portions of the intermediate section being enlarged in internal diameter and having internal shoulders, tubular end sections adapted to be secured to parts of said line and entering the enlarged end portions of the intermediate section to communicate therewith, the portions of the end sections which enter the intermediate section having external annular flanges, anti-friction bearings engaged against said shoulders and the outer sides of said flanges and fitting within the end portions of the intermediate section to connect the end sections and the intermediate section for free relative rotation, and lock nuts threaded into the opposite ends of the intermediate section engaging against the outer ends of the bearings and removable to render the bearings accessible.

8. A joint adapted to be interposed in a fluid conducting line including an intermediate tubular section, the opposite end portions of the intermediate section being enlarged in internal diameter and having internal shoulders, tubular end sections adapted to be secured to parts of said line and entering the enlarged end portions of the intermediate section to communicate with the intermediate section, the portions of the end sections which enter the intermediate section having external annular flanges, anti-friction bearings engaged against said shoulders and the outer sides of said flanges and fitting within the end portions of the intermediate section to connect the end sections and the intermediate section for free relative rotation, lock nuts threaded into the opposite ends of the intermediate section and engaging against the outer sides of the bearings, and lubricant retaining rings in the nuts for sealing with the end sections to retain lubricant in the bearings.

9. A joint adapted to be interposed in a fluid conducting line including an intermediate tubular section, the opposite end portions of the intermediate section being enlarged in internal diameter and having internal shoulders, tubular end sections adapted to be secured to parts of said line and entering the enlarged end portions of the intermediate section to communicate with the intermediate section, the portions of the end sections which enter the intermediate section having external annular flanges, anti-friction bearings engaged against said shoulders and the outer sides of said flanges and fitting within the end portions of the intermediate section to connect the end sections and the intermediate section for free relative rotation, lock nuts threaded into the opposite ends of the intermediate section and engaging against the outer ends of the bearings, and a filter unit secured to the inner end of an end section and housed within the intermediate section.

10. A joint of the character described including, an intermediate section with an elongate tubular central portion and enlarged end portions at the ends of the central portion, tubular end sections extending into said enlarged portions to communicate with the central portion of the intermediate section, ball bearings in the enlarged portions rotatably supporting the end sections therein, packing in the enlarged portions packing between the intermediate and end sections and located in the enlarged portions inward of the ball bearings, and a filter in the central portion.

11. A joint of the character described including, an intermediate section with an elongate tubular central portion and enlarged end portions at the ends of the central portion, end sections extending into said enlarged portions to communicate with the central portion of the intermediate section and each having a radial flange within the enlarged portion which receives it, ball bearings in the enlarged portions at the outer sides of the flanges rotatably supporting the end sections in the enlarged portions, packing in the enlarged portions around the end sections and at the inner sides of the flanges, and a filter in the central portion.

DWIGHT M. PHILLIPS.